(12) United States Patent
Cremer

(10) Patent No.: US 8,450,384 B2
(45) Date of Patent: May 28, 2013

(54) POLYURETHANE FOAM CONTAINING SILICONE

(75) Inventor: Jens Cremer, Munich (DE)

(73) Assignee: Wacker Chemie AG, Munich (DE)

( * ) Notice: Subject to any disclaimer, the term of this patent is extended or adjusted under 35 U.S.C. 154(b) by 120 days.

(21) Appl. No.: 13/126,282

(22) PCT Filed: Dec. 8, 2009

(86) PCT No.: PCT/EP2009/066624
§ 371 (c)(1),
(2), (4) Date: Apr. 27, 2011

(87) PCT Pub. No.: WO2010/069821
PCT Pub. Date: Jun. 24, 2010

(65) Prior Publication Data
US 2011/0201712 A1 Aug. 18, 2011

(30) Foreign Application Priority Data

Dec. 16, 2008 (DE) .......................... 10 2008 054 774

(51) Int. Cl.
*C08L 83/08* (2006.01)
*C08G 77/26* (2006.01)
*C08J 9/04* (2006.01)

(52) U.S. Cl.
USPC ........................................... 521/137; 528/28

(58) Field of Classification Search
USPC .......................................................... 521/137
See application file for complete search history.

(56) References Cited

U.S. PATENT DOCUMENTS

| 4,350,777 | A | * | 9/1982 | Henrichs et al. | .............. 521/110 |
| 4,568,701 | A | | 2/1986 | Hopkins, Jr. | |
| 4,590,224 | A | | 5/1986 | Frisch, Jr. | |
| 4,758,601 | A | * | 7/1988 | Haas et al. | .................... 521/108 |
| 5,151,216 | A | | 9/1992 | Liu | |
| 6,534,600 | B2 | | 3/2003 | Dvornic et al. | |
| 2005/0131088 | A1 | | 6/2005 | Stanjek et al. | |
| 2009/0099291 | A1 | * | 4/2009 | Jia et al. | ........................ 524/425 |
| 2009/0105358 | A1 | | 4/2009 | Cremer et al. | |
| 2010/0261804 | A1 | * | 10/2010 | Yamanaka et al. | ............. 521/137 |

FOREIGN PATENT DOCUMENTS

DE 10 2006 013 416 A1 9/2007
EP 1 485 419 B1 1/2003

OTHER PUBLICATIONS

C.Gao et al., "Hyperbranched Polymers: From Synthesis to Applications" Pro. Polym. Sci. 29 (2004) pp. 183-275; Elsevier Ltd.

* cited by examiner

*Primary Examiner* — Robert S Loewe
(74) *Attorney, Agent, or Firm* — Brooks Kushman P.C.

(57) ABSTRACT

Low density, flame-retardant polyurethane foams are prepared by reaction of a polyisocyanate with a branched organopolysiloxane prepared by reaction of a reactive hydrogen-functional organopolysiloxane with a polyisocyanate followed by reaction with an amine. Water is preferably used as a blowing agent in a one shot process.

19 Claims, No Drawings

POLYURETHANE FOAM CONTAINING SILICONE

CROSS-REFERENCE TO RELATED APPLICATION

This application is the U.S. national phase of PCT Appln. No. PCT/EP2009/066624 filed Dec. 8, 2009 which claims priority to German application DE 10 2008 054 774.3 filed Dec. 16, 2008.

BACKGROUND OF THE INVENTION

1. Field of the Invention

This invention relates to foamable preparations based on organosilicon compounds, to siloxanes present therein, to silicone-containing polyurethane foams having low densities, and also to processes for production thereof.

2. Description of the Related Art

Polyurethane foams are generally prepared by reaction of a polyisocyanate with compounds containing two or more active hydrogen atoms. The compounds containing active hydrogen are typically polyols, primary and secondary polyamines, and water. Between these reactants there are two principal reactions that occur during the preparation of a polyurethane foam. These reactions must in principle run simultaneously and with a competitively balanced rate during the operation, in order to produce a polyurethane foam having desired physical properties. The reaction between the isocyanate and the polyol or polyamine, which is typically termed a gel reaction, leads to the formation of a polymer with a high molecular weight. The progress of this reaction increases the viscosity of the mixture and contributes generally to the formation of crosslinking with polyfunctional polyols. The second principal reaction takes place between the polyisocyanate and water. This reaction contributes to the growth of the urethane polymer and is important for the formation of carbon dioxide gas, which assists the foaming process. Consequently this reaction is often termed the blowing reaction. Both the gel reaction and the blowing reaction take place in foams which are blown partially or completely with carbon dioxide gas. If, for example, the evolution of carbon dioxide is too rapid by comparison with the gel reaction, the foam exhibits a proclivity to collapse. If, alternatively, the gel expansion reaction is too rapid as compared with the blowing reaction that produces carbon dioxide, foam rise is limited, and a high-density foam is produced. Similarly, poorly matched crosslinking reactions will impact adversely on foam stability. The polyols used are generally polypropylene glycols, which in accordance with the prior art can be prepared in a very wide variety of topologies, and differ from one another in molecular weight, degree of branching, and OH number. In spite of the broad structural variation of these polyols and the associated tailoring of the polyurethane foams to virtually any application, the inherent flammability of the commercially available polyurethane foams is a serious drawback. In spite of great efforts, success has so far not been achieved in establishing absolutely inflammable flexible PU foams on the market, although in recent decades there has been no lack of intense research activities aimed at improving the flame retardancy properties of polymer foams.

One route to flame-retarded, flexible PU foams is taken in silicone-polyurethane flexible foams. In such foams, the highly combustible polyol component that is used in standard PU foams is replaced by incombustible, OH-terminated siloxanes. Through the use of silicone-polyurethane copolymers, i.e., of polysiloxanes, which also contain polyurethane units and/or urea units, it is possible to develop incombustible foam materials of this kind which have new combinations of properties that are tailored precisely to the particular application. Reference on this point may be made, for example, to EP 1485419 B1, which describes the preparation of silicone-polyurethane foams starting from alkylamino- or alkylhydroxy-terminated silicone oils and diisocyanates in what is called a "one-shot" process. Furthermore, DE 102006013416 A1 describes the preparation of silicone-PU foams from prepolymers which are prepared in a solvent-based operation on the basis of alkylamino- or alkylhydroxy-terminated silicone oils and diisocyanates.

A feature which unites the silicone-polyurethane foams that have been described to date is that they are prepared on the basis of siloxanes which are linear or have only very slight, but statistical, branching in the side chains. In view of this linear siloxane chain, the rise phase during foaming is not accompanied by an increase in molar mass, and so the increase in viscosity during the rise phase is relatively slow, meaning that the polymer matrix, even after the end of the blowing reaction, is generally slightly fluid, and, therefore, the fine cell structure may still collapse before curing of the foam is complete. Even if only a small fraction of the cell structure collapses in on itself, the result is a coarse and irregular cell distribution. In order to counteract cell collapse when using linear polyol components, the struts connecting the individual foam cells must not fall below a critical diameter during the rise phase. Hence it is ensured that the still fluid polymatrix is able to counteract the threat of collapse of the foam structure. If, however, the desired foam density selected is too low, then the cell struts become increasingly thin during the rise phase until, finally, they become too flexible to stabilize the cell structure. Accordingly, in general, linear siloxanes result only in silicone-PU foams having densities of distinctly above 100 $kg/m^3$.

Hyperbranched polymers are already known and are discussed exhaustively, for example, in the review article by C. Gao, D. Yan; *Prog. Polym. Sci.*, 2004, 24, 183-275, in relation to synthesis, properties, and applications. Hyperbranched polymers are a subset of dendritic macromolecules, and possess greater branching than conventionally branched polymers, which primarily have primary or secondary branches on a linear main chain. To date, for the synthesis of hyperbranched polymers, divergent synthesis methods have been employed, where a monomer possesses just two different kinds of functional groups that react with one another, but not with themselves, the functionality of the monomers being in total greater than two. Examples of suitable monomers are those which possess one functional group A and two functional groups B, i.e., a $AB_2$ monomer. In principle it is possible to use all monomers $AB_x$ where x>1. The use of $AB_x$ monomers in a monomolecular polymerization, however, is possible only when the A and B groups react with one another only when such reaction is desired in the polymer synthesis, in other words following addition of a catalyst or as a result of an increase in temperature. An alternative possibility is for hyperbranched polymers to be synthesized with two different types of monomer each having only one kind of functional groups, but in different numbers, such as $A_3$ and $B_2$ units, for example. Through a reaction of these two $A_3$ and $B_2$ types it is then possible in situ to obtain $A_2B$ and $AB_2$ monomer blocks (di-molecular polymerization: generally with $A_x$ and $B_y$, where x>1 and y>2). Processes of this kind are general knowledge and are described, for example, in U.S. Pat. No. 6,534,600.

A further disadvantage with the silicone-PU foams described to date is that NCO-terminated silicone prepolymers have to be used if silicone-PU foams having low densities are to be obtained. The preparation of appropriate prepolymers requires an additional step of synthesis and, moreover, such prepolymers have but limited stability in storage at elevated temperatures in particular.

SUMMARY OF THE INVENTION

It would accordingly be desirable to have a process whereby the classic one-shot method can be utilized in foam production. In such a process, the polyol and isocyanate parts would be prepared independently of each other and would only be made to react with each other in the foaming operation. These and other objects are achieved by the present invention, wherein foamable siloxanes are formed by the reaction of a reactive linear organopolysiloxane with a polyisocyanate and an amine.

DETAILED DESCRIPTION OF THE PREFERRED EMBODIMENTS

The present invention provides siloxanes (A) of the formula

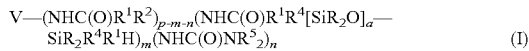

$$V—(NHC(O)R^1R^2)_{p-m-n}(NHC(O)R^1R^4[SiR_2O]_a—SiR_2R^4R^1H)_m(NHC(O)NR^5_2)_n \quad (I)$$

where

V is a p-valent hydrocarbon radical which may contain heteroatoms,

R in each occurrence can be the same or different and is a monovalent, optionally substituted hydrocarbon radical, $R^1$ in each occurrence can be the same or different and is —O—, —S— or —NR$^3$—, $R^2$ in each occurrence can be the same or different and represents hydrogen atom and monovalent, optionally substituted hydrocarbon radicals, $R^3$ is hydrogen atom or monovalent, optionally substituted hydrocarbon radical, $R^4$ in each occurrence can be the same or different and is a divalent, optionally substituted hydrocarbon radical, $R^5$ in each occurrence can be the same or different and is hydrogen atom or an optionally substituted hydrocarbon radical, a is an integer not less than 1, preferably in the range from 1 to 1000, more preferably in the range from 5 to 500 and even more preferably in the range from 10 to 100, p is an integer not less than 2, preferably in the range from 2 to 20 and more preferably 3 or 4, m is an integer not less than 1, preferably in the range from 1 to 19 and more preferably in the range from 1 to 3, n is an integer not less than 1, preferably in the range from 1 to 19 and more preferably in the range from 1 to 3, with the proviso that p is not less than m+n.

Examples of R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radicals; cycloalkyl radicals such as cyclopentyl, cyclohexyl, cycloheptyl and methylcyclohexyl radicals; aryl radicals such as the phenyl and the naphthyl radicals; alkaryl radicals such as o-, m-, p-tolyl radicals, xylyl radicals, and ethylphenyl radicals; aralkyl radicals such as the benzyl radical, and the α- and the β-phenylethyl radicals.

Examples of substituted hydrocarbon radicals R are alkoxyalkylene radicals such as methoxymethylene and ethoxymethylene radicals, hydroxyalkylene radicals such as 2-hydroxyethylene radicals, and aminoalkylene radicals such as dimethylaminoethylene, diethylaminomethylene, 2-aminoethylene and N-methylaminoethylene radicals.

The radical R preferably comprises monovalent, optionally substituted hydrocarbon radicals having from 1 to 40 carbon atoms, more preferably hydrocarbon radicals having from 1 to 6 carbon atoms and most preferably the methyl radical.

Examples of $R^3$ are hydrogen and the examples recited for the radical R. The $R^3$ radical is preferably hydrogen.

$R^1$ preferably comprises —O—.

Examples of $R^2$ radicals are hydrogen and also the examples mentioned for the radical R. The $R^2$ radical preferably comprises hydrocarbon radicals having from 1 to 6 carbon atoms and more preferably comprises the methyl radical.

Examples of the $R^4$ radical are methylene, ethylene, propylene, butylene, pentylene, hexamethylene, methyloxyethylene, tolylene, methylenebisphenylene, phenylene, naphthylene, cyclohexylene and isophorone radicals.

Preferably $R^4$ comprises divalent, aliphatic hydrocarbon radicals which may be interrupted by heteroatoms, more preferably propylene, methylene and methyloxyethylene radicals, yet more preferably methylene and methyloxyethylene radicals, and most preferably methylene.

Examples of $R^5$ are the radicals recited for R.

$R^5$ preferably comprises hydrogen, optionally hydroxyl-substituted hydrocarbon radicals, more preferably optionally hydroxyl-substituted hydrocarbon radicals and most preferably alkyl radicals having from 1 to 6 carbon atoms and hydroxyalkyl radicals having from 1 to 6 carbon atoms.

Examples of the radical V are any desired polyvalent, aliphatic or aromatic hydrocarbon radicals which may include heteroatoms, such as 1,3,4-benzene radicals, 1,3,5-cyanurate radicals, N,N,N'-biuret radicals, 4,4',4''-triphenylmethane radicals and poly((4-phenyl)coformaldehyde) radicals.

The radical V preferably comprises polyvalent radicals having from 1 to 50 carbon atoms and more preferably having from 6 to 30 carbon atoms. The radical V more preferably comprises polyvalent, aromatic, optionally heteroatom-containing hydrocarbon radicals, yet more preferably polyvalent aromatic, optionally nitrogen- and oxygen-containing hydrocarbon radicals, and most preferably polyvalent aromatic, optionally nitrogen- and oxygen-containing hydrocarbon radicals having from 6 to 30 carbon atoms.

In the siloxanes (A) of formula (I) according to the present invention, the sum total m+n is preferably equal to p.

The siloxanes (A) of formula (I) according to the present invention preferably have a viscosity of 100 to 10,000 mPas and more preferably 500 to 5000 mPas, all measured at 25° C. according to ASTM D 4283.

The siloxanes (A) of the present invention are preferably hyperbranched, and are obtainable by commonplace methods in silicon chemistry.

The siloxanes (A) of the present invention preferably comprise those obtainable by reaction of
(i) a linear α,ω-aminoorganyl-functionalized or α,ω-hydroxyorganyl-functionalized siloxane with
(ii) a polyisocyanate and
(iii) an amine.

The present invention further provides a process for preparing the siloxanes (A) by reaction of
(i) a linear α,ω-aminoorganyl-functionalized or α,ω-hydroxyorganyl-functionalized siloxane with (ii) a polyisocyanate and
(iii) an amine.

Component (i) preferably comprises siloxanes of the formula $$HR^1R^4[SiR_2O]_a\text{—}SiR_2R^4R^1H \quad (II)$$

where $R$, $R^1$, $R^4$ and $a$ are each as defined above.

Examples of component (i) are $$HOCH_2\text{—}[SiMe_2O]_{2\text{-}100}\text{—}SiMe_2CH_2OH,$$

$$HOCH_2\text{—}CH_2\text{—}OCH_2\text{—}[SiMe_2O]_{2\text{-}100}\text{—}\\SiMe_2CH_2O\text{—}CH_2\text{—}CH_2OH,$$

$$H_2NCH_2\text{—}[SiMe_2O]_{2\text{-}100}\text{—}SiMe_2CH_2NH_2,$$

$$H_2NCH_2\text{—}CH_2\text{—}CH_2\text{—}[SiMe_2O]_{2\text{-}100}\text{—}\\SiMe_2CH_2\text{—}CH_2\text{—}CH_2NH_2,$$

$$H_3C\text{—}HNCH_2\text{—}CH_2\text{—}CH_2\text{—}[SiMe_2O]_{2\text{-}100}\text{—}\\SiMe_2CH_2\text{—}CH_2NH\text{—}CH_3,$$

where Me is methyl. The process for preparing the aforementioned linear siloxanes is such that up to 0.1% of all units include branching, as in $MeSiO_{3/2}$ or $SiO_{4/2}$ units for instance.

Component (i) preferably comprises $$HOCH_2\text{—}[SiMe_2O]_{2\text{-}100}\text{—}SiMe_2CH_2OH,$$

$$HOCH_2\text{—}CH_2\text{—}OCH_2\text{—}[SiMe_2O]_{2\text{-}100}\text{—}\\SiMe_2CH_2O\text{—}CH_2\text{—}CH_2OH,$$

where $HOCH_2\text{—}[SiMe_2O]_{2\text{-}100}\text{—}SiMe_2CH_2OH$ is particularly preferred.

The siloxanes (i) comprise commercially available products and/or are obtainable by methods commonplace in silicon chemistry.

The polyisocyanates (ii) used according to the present invention comprise all known di- or polyisocyanates.

Preference for use as polyisocyanates (ii) is given to those of the general formula $$V(NCO)_p \quad (III)$$

where
V and p each have one of the abovementioned meanings.

Examples of polyisocyanates (ii) are diisocyanato-diphenylmethane (MDI), not only in the form of crude or technical MDI but also in the form of pure 4,4' and/or 2,4' isomers or compositions thereof, tolylene diisocyanate (TDI) in the form of its various regioisomers, diisocyanatonaphthalene (NDI), isophorone diisocyanate (IPDI), 1,3-bis(1-isocyanato-1-methyl-ethyl)benzene (TMXDI) or else hexamethylene diisocyanate (HDI), and also polymeric MDI (p-MDI), triphenylmethane triisocyanate or biuret trimers or isocyanurate trimers of the abovementioned isocyanates.

Polyisocyanates (ii) are preferably used in amounts of from 0.1 to 30 parts by weight, more preferably from 0.1 to 20 parts by weight and most preferably from 1 to 10 parts by weight, all based on 100 parts by weight of siloxane (i).

The amines (iii) used according to the present invention preferably comprise those of the formula $$HNR^5_2 \quad (IV)$$

where $R^5$ has one of the abovementioned meanings and preferably not more than one $R^5$ radical is hydrogen,
and also aliphatic cyclic amines and aromatic cyclic amines which may include additional functional groups such as thiol, hydroxyl or further amino groups.

Examples of amine (iii) are dimethylamine, diethyl-amine, butylamine, dibutylamine, diisopropylamine, pentylamine, cyclohexylamine, N-methylcyclohexylamine, aniline, morpholine, pyrrolidine, piperidine, imidazole, piperazine, ethylenediamine, N,N'-dimethyl-ethylenediamine, ethanolamine, N-methylethanolamine, diethanolamine, propanolamine, alaninol, N-methyl(thio-ethanol)amine.

The amines (iii) preferably comprise aliphatic amines, more preferably pyrrolidine, diethanolamine, ethanolamine and N-methylethanolamine and most preferably pyrrolidine, ethanolamine and N-methylethanolamine.

According to the present invention, amines (iii) are preferably used in amounts of from 0.1 to 20 parts by weight, more preferably from 0.1 to 10 parts by weight and most preferably from 0.5 to 5 parts by weight, all based on 100 parts by weight of siloxane (i).

When the starting materials (i), (ii) and (iii) are subjected to the reaction of the present invention, it is preferable to use organic solvent (iv) and catalysts (v).

Examples of organic solvents (iv) are ethers, more particularly aliphatic ethers such as dimethyl ether, diethyl ether, methyl t-butyl ether, diisopropyl ether, dioxane or tetrahydrofuran, esters, more particularly aliphatic esters such as ethyl acetate or butyl acetate, ketones, more particularly aliphatic ketones such as acetone or methyl ethyl ketone, sterically hindered alcohols, more particularly aliphatic alcohols such as t-butanol, amides such as DMF, aromatic hydrocarbons such as toluene or xylene, aliphatic hydrocarbons such as pentane, cyclopentane, hexane, cyclohexane, heptane, and chlorinated hydrocarbons such as methylene chloride or chloroform.

The organic solvents (iv) preferably comprise aliphatic ethers, aliphatic ketones or aliphatic esters, of which aliphatic ketones are particularly preferred.

When organic solvents (iv) are used, amounts preferably comprise from 1 to 1000 parts by weight, more preferably from 10 to 500 parts by weight and most preferably from 30 to 200 parts by weight, all based on 100 parts by weight of siloxane (i). The reaction of the present invention does preferably utilize solvents (iv).

Examples of catalysts (v) are tin compounds such as dibutyltin dilaurate, dioctyltin dilaurate, dibutyltin diacetate, dibutyltin dioctoate, dibutyltin bis(dodecylmercaptide), and tin(II) 2-ethylhexanoate; zinc compounds such as zinc(II) 2-ethylhexanoate; bismuth compounds such as bismuth(III) neodecanoate; zirconium compounds such as zirconium tetrakis(2,2,6,6-tetramethylheptane-3,5-dionate); and amines such as 1,4-diazabicyclo[2,2,2]octane.

The catalysts (v) preferably comprise tin, zirconium or bismuth compounds, of which bismuth compounds are particularly preferred.

When catalysts (v) are used, the amounts involved preferably range from 1 to 1000 ppm by weight, more preferably from 10 to 500 ppm and most preferably from 50 to 150 ppm, all based on the total weight of the reaction mixture. The reaction of the present invention does preferably utilize catalysts (v).

The components used for reaction according to the present invention may each comprise one type of such a component and also a mixture of two or more types of a particular component.

The reaction of the present invention preferably comprises a first stage of reacting siloxanes (i) with polyisocyanates (ii) in the presence or absence of solvent (iv) and in the presence or absence of catalyst (v) and a second stage of reacting the resulting reaction mixture with amines (iii).

The reaction of the present invention is preferably carried out at temperatures of 20 to 100° C. and more preferably 30 to 80° C., and at the pressure of the ambient atmosphere, i.e., 900 to 1100 hPa. However, it can also be carried out at higher pressures, for example at 1200 to 10,000 hPa.

The reaction of the present invention is preferably carried out under an inert gas atmosphere, such as nitrogen or argon, for example.

The reaction mixture obtained after the reaction of the present invention has ended can be worked up in any desired previously known manner. Preferably, any organic solvent used is removed, which is more preferably done distillatively and—as far as the technical possibilities allow—completely. The reaction mixture preferably does not contain any remaining starting materials. When the reaction mixture does contain as yet unreacted starting materials, these preferably remain therein.

The organopolysiloxanes of the present invention are preferably used in the manufacture of foamable preparations.

The present invention further provides foamable compositions containing organopolysiloxanes (A) and polyisocyanates (B).

Useful isocyanates (B) for the purposes of the present invention include all known di- or polyisocyanates, for example the isocyanates recited above under (ii).

Preference for use as polyisocyanates (B) is given to those of the general formula

$$Q(NCO)_b \qquad (V)$$

where

Q is a b-functional, optionally substituted hydrocarbon radical and b is an integer of at least 2, preferably in the range from 2 to 10, more preferably 2 to 4 and more particularly 2 to 3.

Preferably, Q comprises optionally substituted hydrocarbon radicals having from 4 to 30 carbon atoms and more preferably hydrocarbon radicals having from 6 to 25 carbon atoms.

The preparations of the present invention preferably contain isocyanates (B) in amounts of from 0.1 to 150 parts by weight, more preferably from 1 to 100 parts by weight and most preferably from 10 to 50 parts by weight, all based on 100 parts by weight of siloxane (A).

In addition to the siloxanes (A) and polyisocyanates (B), the preparations of the present invention may contain further substances, for example fillers (C), emulsifiers (D), physical blowing agents (E), catalysts (F), chemical blowing agents (G) and additives (H).

When fillers (C) are used, the fillers may be all nonreinforcing fillers, i.e., fillers having a BET surface area of up to 50 $m^2/g$, such as chalk, or reinforcing fillers, i.e., fillers having a BET surface area of at least 50 $m^2/g$, such as carbon black, precipitated silica or fumed silica. In particular both hydrophobic and hydrophilic fumed silicas represent a preferred filler. One particularly preferred embodiment of the invention uses a hydrophobic fumed silica whose surface has been modified with trimethylsilyl groups. The fillers (C) that are used—more particularly fumed silicas—may take on a variety of functions. Thus they may be used to adjust the viscosity of the foamable mixture. In particular, however, they are able to take on a "support function" in the course of foaming, and thus lead to foams having a better foam structure. Finally, the mechanical properties of the resultant foams may also be decisively improved through the use of fillers (C)—especially through the use of fumed silica. In addition, expandable graphite may also be added as filler (C).

When the preparations of the invention comprise fillers (C), the amounts are preferably 0.1 to 30 parts by weight, more preferably 0.1 to 20 parts by weight, and most preferably 0.1 to 15 parts by weight, all based on 100 parts by weight of siloxane (A). The preparation of the invention do preferably comprise fillers (C).

In many cases it is of advantage to add emulsifiers (D) to the foamable compositions. As suitable emulsifiers (D), which also serve as foam stabilizers, it is possible, for example, to use all commercial silicone oligomers that are modified with polyether side chains and that are also used in producing conventional polyurethane foams.

When emulsifiers (D) are used, the amounts are preferably up to 6% by weight, more preferably from 0.3% to 3% by weight, all based on the total weight of the foamable compositions. The preparations of the invention preferably contain no emulsifiers (D).

Moreover, the compositions may also comprise compounds (E) which are able to act as physical blowing agents. As constituent (E) it is preferred to use low molecular mass hydrocarbons such as, for example, propane, butane or cyclopentane, dimethyl ether, fluorinated hydrocarbons such as 1,1-difluoroethane or 1,1,1,2-tetrafluoroethane or $CO_2$. The formation of foam takes place preferably through a reaction of the polyisocyanate (B) with the chemical blowing agent component (G). The use of physical blowing agents (E) in combination with chemical blowing agent constituent (G) may be advantageous, in order to obtain foams having a relatively low density.

When the preparations of the invention comprise constituent (E), the amounts are from preferably 0.1 to 30 parts by weight, more preferably 0.1 to 20 parts by weight, and most preferably 0.1 to 15 parts by weight, all based on 100 parts by weight of siloxane (A). The preparations of the invention preferably contain no physical blowing agent (E).

The foamable preparations of the invention may further comprise catalysts (F) which accelerate the curing of the foam. Suitable catalysts (F) include organotin compounds. Examples are dibutyltin dilaurate, dioctyltin dilaurate, dibutyltin diacetate, dibutyltin dioctoate, dibutyltin bis(dodecylmercaptide) or tin(II) 2-ethylhexanoate. Moreover, tin-free catalysts (F) are contemplated as well, such as, for example, heavy-metal compounds or amines. Examples of tin-free catalysts are iron(III) acetylacetonate, zinc(II) octoate, zirconium(IV) acetylacetonate and bismuth(III) neodecanoate. Examples of amines are triethylamine, tributylamine, 1,4-diazabicyclo[2.2.2]octane, N,N-bis(N,N-dimethyl-2-aminoethyl)methylamine, N,N-dimethylcyclohexylamine, N,N-dimethylphenylamine, bis-N,N-dimethylaminoethyl ether, N,N-dimethyl-2-aminoethanol, N,N-dimethylaminopyridine, N,N,N,N-tetramethyl-bis-2-aminoethylmethylamine, 1,5-diazabicyclo[4.3.0]non-5-ene, 1,8-diazabicyclo[5.4.0]undec-7-ene, N-ethylmorpholine or N,N'-dimethylaminopyridine.

The catalysts (F) may be used individually or as a mixture. If desired, the catalysts used in the preparation of the siloxanes (A) may also serve simultaneously as catalysts (F) for foam curing.

When catalyst (F) is used, the amounts are preferably from 0.1% to 6.0% by weight, more preferably from 0.1% to 3.0% by weight, all based on the total weight of the foamable preparation of the invention. The compositions of the invention preferably do comprise catalysts (F).

As chemical blowing agents (G) it is possible in principle for not only water but also all compounds having preferably at least one isocyanate-reactive function to be used.

Examples of constituent (G) are aminoalkyl- or hydroxy-functional siloxanes other than component (A), monomeric alcohols, monomeric diols such as glycol, propanediol and butanediol, monomeric oligools such as pentaerythritol or trihydroxymethylethane, oligomeric or polymeric alcohols having one, two or more hydroxyl groups such as ethylene glycols or propylene glycols, water, monomeric amines having one, two or more amine functions such as ethylenediamine, hexamethylene-diamine, and also oligomeric or polymeric amines having one, two or more amine functions.

When constituent (G) is used, it preferably comprises hydroxy compounds, with water being particularly preferred.

When constituent (G) is used, the amounts are preferably 0.1 to 20 parts by weight, more preferably from 0.1 to 15 parts by weight, and most preferably from 0.1 to 10 parts by weight, all based on 100 parts by weight of siloxane (A). The compositions of the invention preferably do comprise constituent (G).

Examples of optional additives (H) are cell regulators, thixotropic agents, plasticizers, flame retardants, for example phosphorus-containing compounds, especially phosphates and phosphonates, and also halogenated polyesters and polyols or chlorinated paraffins.

The additives (H) preferably comprise cell regulators and flame retardants, of which cell regulators are particularly preferred.

When additives (H) are used, the amounts preferably range from 0.1 to 30 parts by weight, more preferably from 0.1 to 20 parts by weight and most preferably from 0.1 to 15 parts by weight, all based on 100 parts by weight of siloxane (A). The preparations of the present invention preferably contain no additives (H).

The components of the foamable preparation which are used according to the present invention may each comprise one type of such a component and also a mixture of two or more types of a particular component.

The preparations of the present invention preferably comprise those containing
(A) organopolysiloxanes,
(B) polyisocyanates, optionally
(C) fillers,
optionally
(D) emulsifiers, optionally
(E) physical blowing agents, optionally
(F) catalysts, optionally
(G) chemical blowing agents, and optionally
(H) additives,
wherein the preparations according to the invention contain at least one blowing agent selected from components (E) and (G), more particularly at least (G).

Aside from components (A) and (B) and also optionally one or more of components (C) to (H), the preparations of the present invention preferably do not contain any further constituents.

The preparations of the present invention are obtainable, then, in any desired conventional manner, such as simply mixing the individual components together, although premixtures of individual constituents can also be prepared. It is preferable to prepare 2-part systems, wherein the two parts of the foamable preparation of the present invention contain all the constituents in any desired combinations and mixing ratios, with the proviso that one part does not simultaneously contain siloxanes (A) and polyisocyanates (B) and/or the constituents (B) and (G).

For instance, the preparation of the present invention is preferably obtained by preparing a mixture containing constituent (A), optionally constituent (C), optionally constituent (D), optionally constituent (F), optionally constituent (G) and optionally constituent (H) as part 1 and also a part 2 containing constituent (B) and these parts are then mixed together to obtain the foam of the present invention.

The preparations of the present invention are preferably liquid to highly viscous and preferably have a viscosity of 250 to 10,000 mPas and more preferably 500 to 5000 mPas, all measured at 25° C. as per ASTM D 4283.

The preparations of the present invention are preferably used in the manufacture of foams, more preferably rigid or flexible foams and most preferably flexible foams.

The present invention further provides a process for preparing a silicone-containing polyurethane foam, characterized in that a siloxane (A) according to the present invention, a polyisocyanate (B) and at least one blowing agent are mixed and allowed to react.

In one preferred embodiment of the process according to the present invention, siloxane (A), polyisocyanate (B), catalyst (F) and chemical blowing agent (G) and also optionally component (C) are mixed together and preferably allowed to react at the same time.

The process of the present invention is preferably carried out at initial temperatures of from 0 to 100° C., more preferably from 10 to 40° C. and most preferably from 15 to 30° C. The heat formed in the course of the reaction preferably remains in the system and contributes to foam formation. The process of the present invention reaches reaction temperatures up to preferably from 50 to 150° C.

The process of the present invention is preferably carried out at the pressure of the ambient atmosphere, i.e., about 900 to 1100 hPa.

The process of the present invention preferably releases $CO_2$ which is very largely responsible for the building of the foam structure of the present invention.

The present invention further provides foams obtainable by reaction of siloxanes (A) of the present invention with polyisocyanate (B) and at least one blowing agent.

The foams of the present invention are notable for a fine, open-cell foam structure. Their mechanical properties are equivalent to those of commercially available PU foams.

The foams of the present invention preferably have a density of 10 to 500 kg/m$^3$, more preferably 15 to 200 kg/m$^3$ and most preferably 20 to 120 kg/m$^3$, all determined at 25° C. and 1013 hPa.

The foams of the present invention are usable wherever polyurethane foams have been used to date. More particularly, they are useful for upholstery, thermal insulation and sound insulation.

The foamable preparations of the present invention have the advantage of being very simple to process using existing methods from PU technology.

The preparations of the present invention further have the advantage that they are obtainable using starting materials that are readily available commercially, that they are easy to process and are obtainable with low viscosity.

The preparations of the present invention have the advantage that silicone-polyurethane foams of low density are obtainable by the one-shot method.

The present invention process for producing silicone-containing PU foams has the advantage of being simple to carry out.

The foams of the present invention further have the advantage of being flexible and of extremely low flammability, and the further advantage of having high mechanical strengths, particularly combined with low foam densities.

In the examples below, all parts and percentage data, unless indicated otherwise, are by weight. Unless indicated otherwise, the examples below are carried out under the pressure of the ambient atmosphere, in other words at about 1000 hPa, and at room temperature, in other words about 20° C., or at a temperature which comes about when the reactants are combined at room temperature without additional heating or cooling. All of the viscosity data given in the examples are intended to be based on a temperature of 25° C.

pMDI: polymeric MDI having a functionality of 2.9 (commercially available from BASF SE, Ludwigshafen, Germany, under the name Lupranat® M70R);

amine catalyst: bis(2-dimethylaminoethyl)ether (commercially available from Huntsman Corporation, Hamburg, Germany under the name "Jeffcat® ZF-20"); diazabicyclooctane (commercially available from Air Products GmbH, Hamburg, Germany, under the name DABCO® Crystal)

INVENTIVE EXAMPLE 1

100.00 g of a linear organopolysiloxane of the formula HO—$(CH_2)_2$—O—$(CH_2)$—[Si $(CH_3)_2$—O]$_{32}$Si$(CH_3)_2$—$(CH_2)$—O—$(CH_2)_2$—OH and 7.0 g of pMDI were reacted in 100 ml of absolute acetone under an atmosphere of argon. The reaction was catalyzed with 30 mg of bismuth(III) neodecanoate and stirred at 50° C. After a reaction time of one hour, first 1.0 g of pyrrolidine dissolved in 10 ml of acetone was gradually added dropwise and then the reaction mixture thus obtained was freed of solvent at a pressure of 10 hPa.

33.0 g of the hyperbranched organopolysiloxane thus obtained were initially combined with 7.0 g of TDI to form a homogeneous mixture and then with 0.10 g of bis(2-dimethylaminoethyl)ether and 0.10 g of diaza-bicyclooctane as amine catalysts and also 0.58 g of water emulsified into a homogeneous mixture using a high-speed stirrer. After about 10 seconds an exothermic reaction ensued with foam development. Foam formation concluded after a further 40 seconds or so, whereas heat continued to evolve for about 5 minutes. The result obtained was a colorless, flexible, fire-resistant foam having a density of 50 kg/m$^3$.

COMPARATIVE EXAMPLE 1

100.00 g of a linear organopolysiloxane of the formula HO—$(CH_2)_2$—O—$(CH_2)$—[Si $(CH_3)_2$—O]$_{32}$Si $(CH_3)_2$—$(CH_2)$—O—$(CH_2)_2$—OH and 5.2 g of pMDI were reacted in 100 ml of absolute acetone under an atmosphere of argon. The reaction was catalyzed with 30 mg of bismuth(III) neodecanoate and stirred at 50° C. for 1 hour. Then the reaction mixture was freed of solvent at a pressure of 10 hPa.

32.3 g of the hyperbranched organopolysiloxane thus obtained were initially combined with 7.7 g of TDI to form a homogeneous mixture and then with 0.10 g of bis(2-dimethylaminoethyl)ether and 0.10 g of diaza-bicyclooctane as amine catalysts and also 0.68 g of water emulsified into a homogeneous mixture using a high-speed stirrer. After about 10 seconds an exothermic reaction ensued with foam development. During the rise phase of the foam, the foam structure was observed to collapse, and so no flexible foam could be obtained.

INVENTIVE EXAMPLE 2

100.00 g of a linear organopolysiloxane of the formula HO—$(CH_2)_2$—O—$(CH_2)$—[Si$(CH_3)_2$O]$_{32}$Si$(CH_3)_2$—$(CH_2)$—$(CH_2)_2$—OH and 7.0 g of pMDI were reacted in 100 ml of absolute acetone under an atmosphere of argon. The reaction was catalyzed with 30 mg of bismuth(III) neodecanoate and stirred at 50° C. After a reaction time of one hour, first 1.0 g of N-methylethanolamine dissolved in 10 ml of acetone was gradually added dropwise and then the reaction mixture thus obtained was freed of solvent at a pressure of 10 hPa.

32.0 g of the hyperbranched organopolysiloxane thus obtained were initially combined with 8.0 g of TDI to form a homogeneous mixture and then with 0.10 g of bis(2-dimethylaminoethyl)ether and 0.10 g of diaza-bicyclooctane as amine catalysts and also 0.68 g of water emulsified into a homogeneous mixture using a high-speed stirrer. After about 10 seconds an exothermic reaction ensued with foam development. Foam formation concluded after a further 40 seconds or so, whereas heat continued to evolve for about 5 minutes. The result obtained was a colorless, flexible, fire-resistant foam having a density of 40 kg/m$^3$.

INVENTIVE EXAMPLE 3

80.00 g of a linear organopolysiloxane of the formula HO—$(CH_2)_2$—O—$(CH_2)$—[Si $(CH_3)_2$—O]$_{32}$Si $(CH_3)_2$—$(CH_2)$—O—$(CH_2)_2$—OH and also 20.00 g of a linear organopolysilxane of the formula HO—$(CH_2)_2$O—$(CH_2)$—[Si $(CH_3)_2$—O]$_{12}$Si$(CH_3)_2$—$(CH_2)$—O—$(CH_2)_2$—OH and 8.0 g of pMDI were reacted in 100 ml of absolute acetone under an atmosphere of argon. The reaction was catalyzed with 30 mg of bismuth(III) neodecanoate and stirred at 50° C. After a reaction time of one hour, first 1.0 g of N-methylethanolamine dissolved in 10 ml of acetone was gradually added dropwise and then the reaction mixture thus obtained was freed of solvent at a pressure of 10 hPa.

31.7 g of the hyperbranched organopolysiloxane thus obtained were initially combined with 8.3 g of TDI to form a homogeneous mixture and then with 0.10 g of bis(2-dimethylaminoethyl)ether and 0.10 g of diaza-bicyclooctane as amine catalysts and also 0.68 g of water emulsified into a homogeneous mixture using a high-speed stirrer. After about 10 seconds an exothermic reaction ensued with foam development. Foam formation concluded after a further 40 seconds or so, whereas heat continued to evolve for about 5 minutes. The result obtained was a colorless, flexible, fire-resistant foam having a density of 40 kg/m$^3$.

What is claimed is:

1. A siloxane (A) of the formula

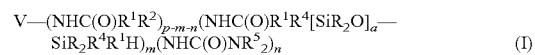

$$V-(NHC(O)R^1R^2)_{p-m-n}(NHC(O)R^1R^4[SiR_2O]_a- \\ SiR_2R^4R^1H)_m(NHC(O)NR^5_2)_n \quad (I)$$

where

V is a p-valent hydrocarbon radical optionally containing heteroatoms,

R each independently is a monovalent, optionally substituted hydrocarbon radical, $R^1$ each independently is —O—, —S— or —$NR^3$—, $R^2$ each independently represents hydrogen or a monovalent, optionally substituted hydrocarbon radical, $R^3$ each individually is hydrogen or a monovalent, optionally substituted hydrocarbon radical, $R^4$ each individually is a divalent, optionally substituted hydrocarbon radical, $R^5$ each individually is hydrogen or an optionally substituted hydrocarbon radical, a is an integer not less than 1, p is an integer not less than 2, m is an integer not less than 1, n is an integer not less than 1, with the proviso that p is not less than m+n.

2. The siloxane (A) of claim 1, wherein p is equal to m+n.

3. The siloxane (A) of claim 1, wherein V comprises polyvalent aromatic, optionally nitrogen- or oxygen-containing hydrocarbon radicals having from 6 to 30 carbon atoms.

4. The siloxane of claim 1, which is obtained by reaction of
(i) a linear α,ω-aminoorganyl-functionalized or α,ω-hydroxyorganyl-functionalized siloxane with
(ii) a polyisocyanate and
(iii) an amine.

5. The siloxane of claim 4, wherein the component i) is reacted with a stoichiometric deficiency of isocyanate, and prior to complete reaction of the isocyanate, the amine is added.

6. A process for preparing a siloxane (A) of claim 1, by reacting
(i) a linear α,ω-aminoorganyl-functionalized or α,ω-hydroxyorganyl-functionalized siloxane with
(ii) a polyisocyanate and
(iii) an amine.

7. The process of claim 6, wherein the component i) is reacted with a stoichiometric deficiency of isocyanate, and prior to complete reaction of the isocyanate, the amine is added.

8. A foamable composition comprising a siloxane (A) of claim 1, and a polyisocyanate (B).

9. The foamable composition of claim 8, further comprising
(C) optionally fillers,
(D) optionally emulsifiers,
(E) optionally physical blowing agents,
(F) optionally catalysts, and
(G) optionally chemical blowing agents,
wherein the preparation contains at least one blowing agent selected from components (E) and (G).

10. The foamable composition of claim 9, wherein no further substances other than components (A) through (G) are present.

11. The foamable composition of claim 9, wherein the polyisocyanate (B) are present in an amount of 0.1 to 150 parts per 100 parts (A).

12. The foamable composition of claim 9, wherein the polyisocyanate (B) are present in an amount of 1 to 100 parts per 100 parts (A).

13. The foamable composition of claim 9, wherein the polyisocyanate (B) are present in an amount of 10 to 50 parts per 100 parts (A).

14. A process for preparing a silicone-containing polyurethane foam, comprising mixing a siloxane (A) of claim 1, a polyisocyanate (B), and at least one blowing agent and allowing the mixture thus formed to react.

15. The process of claim 14, wherein siloxane (A), polyisocyanate (B), a catalyst (F), a chemical blowing agent (G), and also optionally filler (C) are mixed.

16. A foam obtained by reaction of a siloxane (A) of claim 1, with a polyisocyanate (B) and at least one blowing agent.

17. The foam of claim 16, which has a density of from 10-200 Kg/m$^3$.

18. The foam of claim 16, which has a density of from 20 to 120 Kg/m$^3$.

19. The foam of claim 16, which is an open cell foam.

* * * * *